April 17, 1962 D. F. GIBBS 3,030,552

VOLTAGE DRAIN DEVICE

Filed Sept. 23, 1958

INVENTOR.
DON F. GIBBS

BY

Chester W. Brown

ATTORNEY 3,030,552

VOLTAGE DRAIN DEVICE

Don F. Gibbs, Box 321, Cave Junction, Oreg.

Filed Sept. 23, 1958, Ser. No. 762,730
2 Claims. (Cl. 317—61)

This invention relates to a voltage drain device for transmission lines and more particularly a voltage drain device for use on low voltage electric lines for transmitting electrical impulses, such as in telephone systems.

Telephone line wires are frequently in the vicinity of high voltage electric power lines and subject to electrostatic and magnetic coupling which tend to produce undesirable noise effects in the telephone circuit and at times introduces high voltage conditions in the telephone circuit which may subject the user to hazardous electrical shock. Heretofore, expensive devices have been installed on telephone lines designed to reduce the noise effects and drain the induced voltage to ground. It is costly to install them and they do interfere with the linemen repairing a telephone line since it has been customary to mount such devices on poles supporting the telephone wires. This is not to say that such devices are not efficient and effective but the cost involved is almost prohibitive in some telephone systems.

It is an object of this invention to provide a voltage drain device for telephone systems which is simple in construction, relatively inexpensive to fabricate, easy to install and adapted for placement in a position which will not interfere with a workman making repairs.

The purpose of the voltage drain device herein disclosed is to provide a means for draining to ground static voltages produced on a telephone line wire, or the like, by electrostatic and magnetic coupling with high voltage electric power lines or wires and thereby reducing interfering noise in a telephone circuit and minimizing the hazards of an electric shock to a user of the telephone circuit.

Other objects will become apparent as the description of the drawings proceeds; wherein FIG. 1 is a longitudinal sectional view of a voltage drain device embodying my invention.

Figure 1:
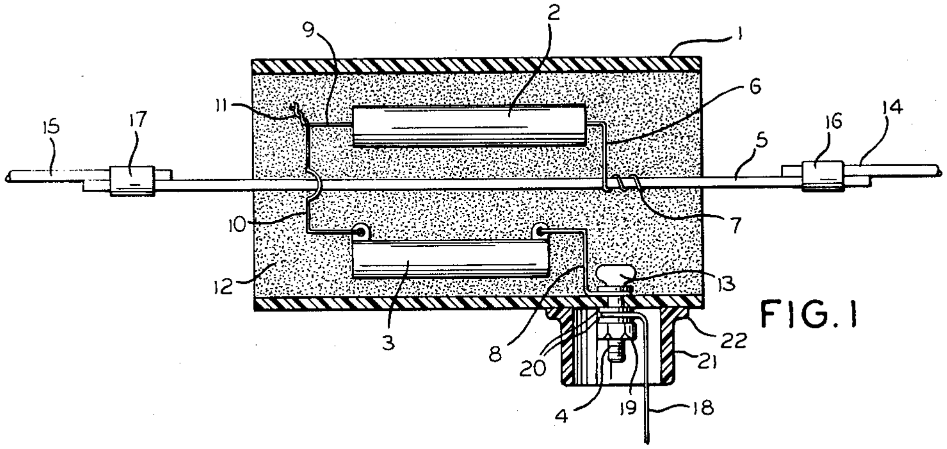

The device illustrated in FIG. 1 comprises an outer insulating tube or housing 1 of any suitable insulating material, such as plastic, a capacitance 2, preferably of 0.125 mfd. and 600 v. D.C. rating, of the foil and paper molded type, a resistor 3, preferably of 10,000 ohm and 10 watt rating of the wire wound type, a grounding stud or terminal 4 extending from the interior of the outer tube 1 to the exterior thereof, and a line terminal or wire 5 extending the outer tube substantially axially thereof.

The capacitance 2 is electrically connected at one end to the terminal wire 5 by means of conductor 6 twisted about the wire 5 and soldered thereto at 7. The resistor 3 is electrically connected at one end to the grounding terminal 4 by means of conductor 8 clamped between the washer 9 and tube 1. Capacitance 2 and resistor 3 connected in series between the wire 5 and the grounding post 4 by means of conductors 9 and 10 which are joined at 11 by twisting and soldering.

When the parts have been assembled as indicated the interior of the tube 1 is filled with an insulating material 12 embedding the portion of the wire 5 within the tube, capacitance 3, resistor 4, connecting conductors 6, 8, 9 and 10 and the flattened end 13 on the grounding stud 4. The encapsulating insulating material may be of any suitable material such as catalyst curing epoxy resin, cable compound or equivalent.

The device illustrated in FIG. 1 is mounted in telephone line, after cutting a section therefrom to provide terminal ends 14 and 15, by securing adjacent ends of the wire 5 to the terminal ends 14 and 15 in any suitable manner, such as by sleeves 16 and 17 crimped to securely engage the wire as indicated. Thus, the wire 5, which is preferably of the same diameter as the telephone line wire, becomes an integral part of the line wire.

The grounding stud 4 is connected to a grounding wire or terminal 18 clamped thereto by means of nut 19 and washers 20. If desired, the device may be provided with an insulating shield 21 surrounding the stud 4 and adapted to prevent moisture from collecting on the stud and affording a leakage path from the wire 5 across the tube 1 to the stud during wet weather conditions. The shield 21 is provided with a flange 22 which conforms to the contour of the tube 1 and secured thereto in any suitable well known manner, such as by hot gas welding.

Figure 2:
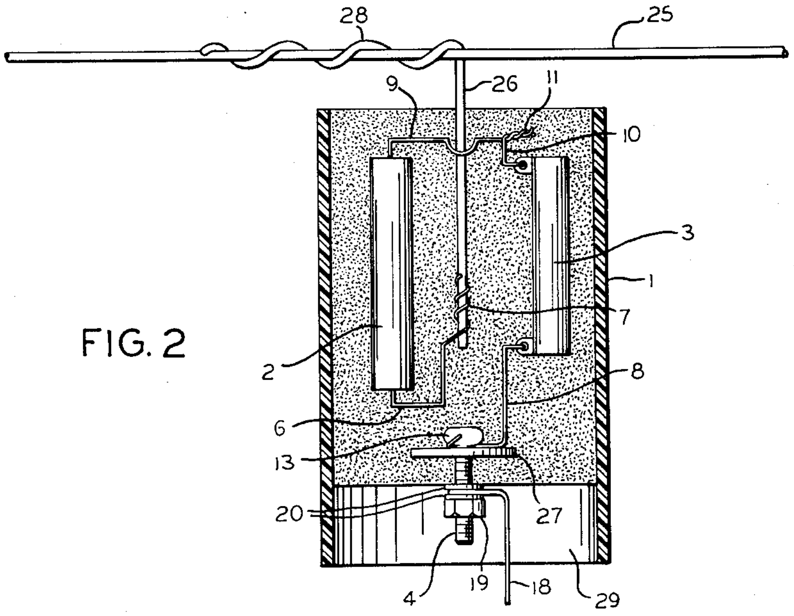
FIG. 2 is a longitudinal sectional view of a modified form of the voltage drain device.

The modified form of the voltage drain device illustrated in FIG. 2 is similar to that shown in FIG. 1 but is arranged for mounting on a telephone line wire 25 without cutting the line wire and eliminating the splicing as at 16 and 17 in FIG. 1.

As in the FIG. 1 disclosure, the FIG. 2 device comprises an insulating tube 1, capacitance 2, resistor 3, grounding stud 4, conductor 6 connecting one end of the capacitance 2 to the supporting terminal wire 26, conductor 8 connecting one end of the resistor 3 to the grounding stud 4, and conductors 9 and 10 connecting the capacitance 2 and resistor 3 in series between the terminal wire 26 and stud 4.

The stud 4 is provided with flattened end 13 and a washer 27 which serve to anchor the stud in encapsulating insulating material $12^1$ which as in FIG. 1 embeds the capacitance and resistor and connecting parts. The supporting terminal wire 26 is secured to the line wire 25 by means of an integral spiral extension 28 which spirally grips the line wire and is preferably of a diameter substantially matching that of the line wire.

The projecting end of the terminal or stud 4 is connected to a grounding wire 18 by means of nut 19 and washers 20. The encapsulating material $12^1$ in FIG. 2 does not completely fill the tube 1, thus the area 29 within the lower end of the tube serves as a recess protecting the stud from the collection of moisture during wet weather conditions and avoids leakage between the line wire 25 and the grounding wire 18.

Figure 3:
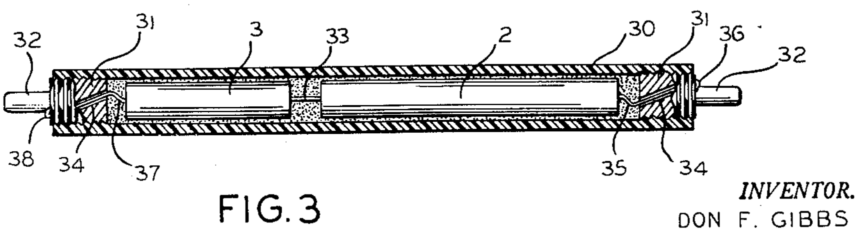
FIG. 3 is a longitudinal sectional view of a further modification.

The modification illustrated in FIG. 3 is adapted for mounting in a housing (not shown) and having a pair of resilient jaw terminals (not shown) one for connection to a line wire and the other for connection to a grounding wire.

The device comprises an elongated insulating tube 30 closed each end by means of a terminal plug 31 threaded thereinto and each having an extension 32 for engagement with a jaw terminal. A capacitance 2 and resistor 3 are placed within the tube 30 and are connected in series by means of conductor 33. Each of the plugs 31 is provided with an angularly extending hole 34. One of the capacitances is connected to the adjacent plug 31 by means of a conductor 35 extending through the aperture 34 and soldered at 36 to the plug. One end of the resistor 2 is connected to the adjacent plug 31 by means of a conductor 37 extending through the hole 34 and soldered to the plug at 38. An encapsulating insulating material 40 within the tube 30 embeds the capacitance and resistor.

Although I have not illustrated in detail the arrangement of the capacitance and resistance per se, it will be readily understood by those skilled in the art that they are available commercially and it will also be understood that a capacitance of the ratings here preferred may be obtained by connecting two capacitances in series of 0.25 mfd. to obtain a rating of 0.125 mfd.

It is to be understood that voltage drain device herein disclosed is not intended to replace lightning arresters and that, should it be damaged by lightning or by current received from an energized electric power line which may have contacted a telephone line wire, it can be easily and quickly replaced by a new one at a relatively low expense.

It will also be understood, that each line wire of a telephone circuit will be equipped with my voltage drain device thus avoiding destruction of protective devices on a line wire not subjected to lightning or currents from a fallen high voltage line in the vicinity.

From the foregoing, it will be apparent that I have provided a voltage drain device which may be manufactured at a reasonable cost, installed at little expense, placed in a position relative to a line wire which will not interfere with workmen, and which may be easily, quickly and inexpensively replaced in case of damage to its components.

I claim as my invention:

1. A voltage drain device comprising a tubular housing, a terminal wire projecting from the interior of said housing outwardly of one end thereof, the projecting end of said terminal wire extending laterally in a radial direction relative to said housing and being in the form of a spiral for gripping engagement with a line wire, a ground terminal in said housing adjacent one end thereof, a capacitance and resistor electrically connected in series between said wire and terminal and disposed in said housing, and an insulating encapsulating material in said housing embedding that portion of said wire within said housing, capacitance, resistor, and a portion of said terminal, said material and housing defining a cavity at one end thereof into which an exposed portion of said terminal projects.

2. A device for connection to electrically conductive lines to provide a high impedance leakage path for high voltage surges induced onto said lines, said device comprising a housing formed of insulating material, at least two external electrical terminals extending from said housing, one of said terminals being adapted for connection to an electrically conductive line to be protected and the other being adapted to be grounded, said housing containing a capacitor having a first and a second end and a resistor having a first end and a second end, the first end of said capacitor being connected to the second end of said resistor and the second end of said capacitor being connected to said one terminal, the first end of said resistor being connected to said other terminal whereby transient surges induced on said line to be protected pass through said capacitor-resistor combination to ground, an insulating anchoring material filling said housing to anchor said capacitor and said resistor in fixed position, and insulating means on said housing surrounding said other terminal for discouraging the external short-circuiting of said two terminals under adverse weather conditions, said housing and said anchoring material being selected to withstand adverse weather without effecting the operation of the device.

References Cited in the file of this patent

UNITED STATES PATENTS

| | | |
|---|---|---|
| 704,023 | Fritts | July 8, 1902 |
| 1,406,002 | Goodman | Feb. 7, 1922 |
| 2,374,560 | Nelson | Apr. 24, 1945 |
| 2,535,129 | Gill | Dec. 26, 1950 |
| 2,666,908 | Klostermann | Jan. 19, 1954 |
| 2,836,805 | Goldsmith | May 27, 1958 |